United States Patent
Asghari et al.

(10) Patent No.: US 9,367,108 B2
(45) Date of Patent: Jun. 14, 2016

(54) REDUCTION OF OPERATIONAL COST USING ENERGY STORAGE MANAGEMENT AND DEMAND RESPONSE

(71) Applicants: Babak Asghari, Sunnyvale, CA (US); Ratnesh Sharma, Fremont, CA (US)

(72) Inventors: Babak Asghari, Sunnyvale, CA (US); Ratnesh Sharma, Fremont, CA (US)

(73) Assignee: NEC Corporation (JP)

( * ) Notice: Subject to any disclaimer, the term of this patent is extended or adjusted under 35 U.S.C. 154(b) by 675 days.

(21) Appl. No.: 13/858,027

(22) Filed: Apr. 6, 2013

(65) Prior Publication Data

US 2014/0005852 A1 Jan. 2, 2014

Related U.S. Application Data

(60) Provisional application No. 61/665,550, filed on Jun. 28, 2012.

(51) Int. Cl.

| G05D 3/12 | (2006.01) |
| G05D 5/00 | (2006.01) |
| G05D 11/00 | (2006.01) |
| G05D 17/00 | (2006.01) |
| G06Q 40/00 | (2012.01) |
| G01R 11/56 | (2006.01) |
| G01R 21/133 | (2006.01) |
| H02J 7/00 | (2006.01) |
| H02J 9/00 | (2006.01) |
| G06F 1/26 | (2006.01) |
| H02J 3/14 | (2006.01) |
| H02J 3/32 | (2006.01) |

(52) U.S. Cl.
CPC ... *G06F 1/26* (2013.01); *H02J 3/14* (2013.01); *H02J 3/32* (2013.01); *H02J 2003/146* (2013.01); *Y02B 70/3225* (2013.01); *Y04S 20/222* (2013.01); *Y04S 20/224* (2013.01)

(58) Field of Classification Search
None
See application file for complete search history.

(56) References Cited

U.S. PATENT DOCUMENTS

| 8,457,802 B1* | 6/2013 | Steven | G06Q 10/00 700/291 |
| 2006/0276938 A1* | 12/2006 | Miller | G06Q 50/06 700/295 |
| 2011/0137481 A1* | 6/2011 | Manz | H02J 3/383 700/291 |
| 2011/0231028 A1* | 9/2011 | Ozog | G06Q 10/06 700/291 |
| 2013/0282193 A1* | 10/2013 | Tyagi | H02J 3/008 700/291 |

* cited by examiner

*Primary Examiner* — Mohammad Ali
*Assistant Examiner* — Md Abul Azad
(74) *Attorney, Agent, or Firm* — Joseph Kolodka

(57) ABSTRACT

A method for managing demand or load includes, upon receipt of a demand response signal or a load management request from a utility to change the price of electricity, determining the cost of energy from a local battery, and if the cost of energy from battery is higher than the cost of electricity from the utility, shedding power from one or more devices based on the utility price, and otherwise discharging power from the battery to reduce a net load on the grid without any actual load reduction.

21 Claims, 6 Drawing Sheets

REDUCTION OF OPERATIONAL COST USING ENERGY STORAGE MANAGEMENT AND DEMAND RESPONSE

The present application is a non-provisional of and claims priority to Provisional Application Ser. 61665550 filed Jun. 28, 2012, the content of which is incorporated by reference.

BACKGROUND

This application relates to power management techniques.

Continuous increase in the electricity consumption around the world places considerable stress on aging power system infrastructures which have already been in use for many years. It is projected that electricity usage in the United States will increase from 3873 TWh in 2008 to 5021 TWh in 2035. Furthermore, summer peak demand in the U.S. is expected to increase by 40% from 2008 to 2030. Environmental pollution and global warming due to the use of fossil fuels for electricity generation and depletion of fossil fuel reserves have already raised serious concerns about sustainable operation of power systems in the future. Conventional power systems also suffer from low efficiency during generation (less than 40% thermal efficiency in steam turbines) and transmission of electricity over long distances from large power plants to load centers.

Ever increasing installation of Distributed Generations (DGs) and energy storage units in residential, commercial, and industrial buildings requires Demand Response (DR) programs which take into account customer side electric energy generation and storage capabilities. Currently there is no model available to advise an energy consumer on whether at each instant of time its demand can be met by the sum of DG output powers and the storage discharge power without decreasing the storage life-time or extra power from the utility (grid) should be purchased.

Conventional DR programs in the distribution level only focus on the interaction between the utility and the end-users based on the grid price signal or incentives offered by the utility. Previous studies in this area neglected the effects of having distributed generations and energy storage units on the energy consumer decision to participate in a demand response program.

A microgrid needs to have a real-time power management system to balance its electricity supply and demand during both transient and steady-state periods. Electric loads can vary significantly based on time of the day, season and load type (residential, commercial, industrial, etc.). Renewable distributed generation outputs also change continuously depending on the irradiation level, wind speed and other meteorological parameters. The pattern of change in DG power outputs can be totally independent of the changes in the load. Forecasting tools have been widely developed and used to estimate the future generation and demand profiles.

Forecasted data can be used to schedule generation from local dispatchable sources (if any) or importing a certain level of power from the grid to a microgrid on a long time-frame basis (e.g. hourly) to support the shortage in renewable generation. However, forecasting errors and fast variations (e.g. minute by minute) in the load and DG power outputs always introduce uncertainty to a microgrid operation which can only be addressed by implementing a real-time power management system.

Batteries can act as a buffer to alleviate the mismatch of generation and demand in a microgrid. In this way, when DGs output power is more than the demand, battery is charged. The battery is discharged during times of low generation and high demand to reduce the power mismatch.

Due to rapid changes in the power output of renewable energy sources over time and variations in the demand, a battery might experience a very irregular pattern of charge and discharge in a microgrid if not controlled properly. This will have a negative impact on battery lifetime and will increase the overall operational cost of the microgrid. Therefore, in addition to balancing supply and demand in real-time, power management system should operate the battery in a way to minimize operational cost of a microgrid.

Typically, the cost components of a battery over a certain time horizon (typically based on useful lifetime of the overall project) including the battery capital cost, replacement cost, as well as operation and maintenance cost (O&MC) are converted into equivalent uniform annual cost (EUAC) as follows:

$$EUAC = \qquad (1)$$
$$RBC \times \{[CC + RC \times SFF(i_{act}, Y_{rep})] \times CRF(i_{act}, Y_{proj})\} + RBC \times O \,\&\, MC \times (1+f)^n$$

where $$SFF(i_{act}, Y_{rep}) = \sum_{i=1}^{NO,rep} \frac{1}{(1+i_{act})^{n \times Y_{rep}}} \qquad (2)$$

$$CRF(i_{act}, Y_{proj}) = (i_{act} \times (1+i_{act})^{Y_{proj}})/((1+i_{act})^{Y_{proj}} - 1) \qquad (3)$$

$$i_{act} = (i_{nom} - f)/(1+f) \qquad (4)$$

Once EUAC is determined, the storage cost can be obtained by dividing EUAC by the expected annual kWh usage of the battery. This approach considers a longer time horizon for battery cost calculation compared to the first method. However, to make a dispatching decision, the future battery usage pattern in a year cannot be assumed a priory.

Both the above cost calculation methods lack a modeling tool to include the effect of DOD and discharge current for individual discharge events on the battery lifetime and the battery cost.

Another solution is the HOMER energy modeling software from NREL. HOMER is used as a baseline to compare the results of proposed intelligent management system with. HOMER user can select between several dispatch strategies and compare the results. However, all these strategies use a wear cost model for batteries which is based on EFC concept. In this model, first, cycle life versus DOD data points of a battery (which should be provided by the user or selected from the program's database) are used to calculate battery lifetime throughput at different DODs as follows:

$$Q_{lifetime,i} = f_i \times DOD_i \times V_{battery} \times C_R / 1000 \qquad (5)$$

HOMER then averages all lifetime throughputs (within the acceptable range of DOD) obtained from (5) which results in a single constant lifetime throughput value for the battery ($Q_{lifetime}$). This value is considered to be the overall kWh energy that can be fed into a battery over its lifetime. Battery wear cost is then calculated by dividing replacement cost of a battery by its lifetime throughput, as follows:

$$C_{bw} = (RBC \times RC)/(Q_{lifetime} \times \mu_{rt}) \qquad (6)$$

Finally, CEB in HOMER is calculated by adding up the battery wear cost and cost of charging the battery:

$$CEB_{HOMER} = C_{bw} + C_{charge} \qquad (7)$$

CEB in HOMER is used to compare marginal cost of generation from a battery (discharging) with other available sources of energy to apply economic dispatch in a microgrid.

HOMER battery cost model is simple and needs minimal data about battery characteristics, however there are major drawbacks compared to the cost model which is used in intelligent power and load management system (IPLMS) proposed in this work. These drawbacks can be summarized as follows:

1) In HOMER only the effect of DOD on battery lifetime can be modeled while IPLMS cost model considers both DOD and discharge rate as parameters affecting a battery lifetime.
2) HOMER model is based on averaging all data points to obtain a single value for the battery lifetime throughput. This assumes that the battery has an equal exposure to all levels of DOD (within the acceptable range) over its lifetime. In practice, however, a battery might experience high or low levels of DOD more often depending on the application and system specifics. In IPLMS, for each individual discharge event, DOD and its effect on the battery lifetime are calculated separately. This results in a more realistic life estimation and consequently cost model for a battery.

SUMMARY

In one aspect, a method for managing demand or load includes, upon receipt of a demand response signal or a load management request from a utility to change the price of electricity, determining the cost of energy from a local battery, and if the cost of energy from battery is higher than the cost of electricity from the utility, shedding power from one or more devices based on the utility price, and otherwise discharging power from the battery to reduce a net load on the grid without any actual load reduction.

In another aspect, a method for managing power includes detecting an unbalance in a supply and a demand based on a measured distributed generation (DG) output and a load demand; if a DG generation of power is more than the demand and an energy storage unit is not fully charged, applying the excess energy generation to charge the storage unit; and if the DG generation is less than the load demand, applying a secondary management scheme to a power shortage either by discharging the battery or by buying power from a grid.

In another aspect, a real-time power and load management controller can be used. The controller collects information about different DG generation power, storage state of charge, and the end-user demand This will determine discharge pattern of the storage at the time of management which is used to estimate the battery lifetime and consequently calculating the cost of energy from the battery based on a levelized cost model. The cost of energy from the battery is then compared to the grid price signal. In this way the end-user can determine whether it is more cost-effective to use its own storage unit or to buy the power from the grid to balance the electric supply and demand In case that the purchase of power from the grid is recommended, the end-user can decide to cut its load during high grid prices to reduce its utility bill. The management framework will be updated every minute.

Advantages of the management system may include one or more of the following. The system includes a levelized cost model for the storage which provides the cost of energy from the battery to be compared with the grid price. Deciding in real-time if a demand response execution (load shedding) can result in any saving in terms of the utility bill. This method provides a realistic price signal for the cost of energy from the battery. This enables the end-user or an automated energy management system to decide when to use the battery, when to use the grid and when to execute a demand response to minimize the operational cost and optimally use the storage over any predefined period of time. The system provides a guideline for energy consumers to assess the benefits and an automated mechanism to participate in a DR program. It can be used to ensure the end-users that their storage unit will be fully utilized during the desired time span already specified. Also, it detects in real-time when is necessary to buy the power from the grid and how much saving can be achieved by cutting the load. Real-time control takes into account any unexpected changes in the distributed generation, demand, and the grid price signal. The whole algorithm presents relatively small complexity and very fast solution so that it can be easily implemented in real-time. Overall, it characterizes demand as a virtual resource.

DESCRIPTION

Figure 1A:
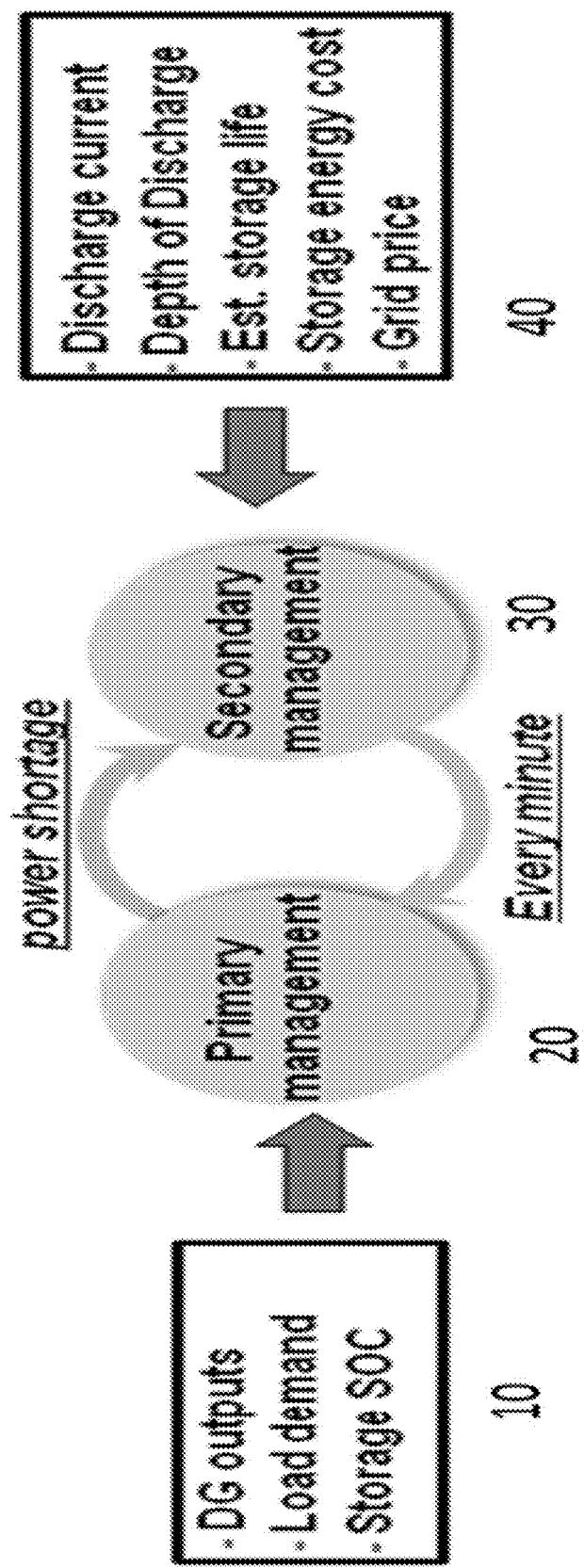
FIG. 1A shows an exemplary block diagram of a power management unit.

To enhance the operation of a microgrid, a two level intelligent power management system (IPMS) is disclosed. A general structure of primary and secondary power managements in IPLMS is shown in FIG. 1A and detailed below. This hierarchical approach makes it easy to prioritize different tasks of the management system based on their importance. Overall, HOMER provides a powerful tool for economical design and making decision about types and ratings of different assets to be utilized in a microgrid. Once the design and sizing stages are complete, IPLMS can result in a more cost-effective control and operation of a microgrid in real time.

In order to find the proper time to discharge a battery in a microgrid, it is necessary to calculate the cost of energy from battery (CEB) and compare it with costs of other available sources of energy. For this purpose, in this study, a novel cost model based on equivalent uniform annual cost (EUAC) for the battery is presented. Equivalent uniform annual cost (EUAC) is a well-known decision making tool to compare different investment projects. It can be used to specify the annual cost of operating a generator asset over its useful lifetime as shown in (1)-(4).

For a battery, number of replacements and the replacement years in (2) are determined by a battery life estimator unit which is explained in the next section. Battery usage cost (BUC) in terms of $/kWh is then calculated from EUAC as follows:

$$BUC = \frac{EUAC}{8760 \times RBC} \quad (8)$$

If the battery is charged by renewable generation, CEB is equal to BUC because power from renewable sources is almost free after the installation. In the case of charging the battery by other generator assets such as a diesel generator or the grid, CEB can be written as:

$$CEB = BUC + C_{charge} \quad (9)$$

CEB can be used to compare cost of generating electric energy by discharging a battery with cost of buying power from other sources of energy such as the grid or a diesel generator at each time instants. Parameters such as useful lifetime of the project, inflation and interest rates, and capital and replacement costs are time-independent and only needed once at the initialization stage of cost calculation. However, over the time, the output of battery life estimate or BLE block varies depending on the updated historical discharge profile of the battery. Whenever the estimated life of the battery becomes less than the useful lifetime of the project, a replacement cost component is added to EUAC which makes cost of energy from battery more expensive. In this way, CEB changes dynamically to reflect the most recent estimated life of the battery in a microgrid. Since the number of battery replacements is always an integer number greater or equal to zero, CEB changes in discrete steps depending on the number of replacements within the useful lifetime of the project.

A necessary step in design of the intelligent management system is to estimate the remaining life of a battery and its level of degradation at each instant. The main three parameters contributing to a battery aging process are DOD, rate of discharge (discharge current), and the temperature. In one embodiment, the effects of the first two parameters on the battery aging are considered. Assuming the presence of environmental controls, temperature-based battery aging can be ignored.

The life estimation method is based on the concept of effective ampere-hours for a battery cell. The required data to implement this BLE is generally available for public from the battery datasheets or it can be obtained by a limited set of experiments on the battery by the user. This makes this approach easy to implement and universal for all different types of batteries.

In order to calculate the effective ampere-hours of a particular discharge event for a battery, it is necessary to multiply the measured ampere-hour during the discharge event by two weighting factors related to DOD and the relative magnitude of discharge current. These two factors can be written as follows:

$$L_1 = \left(\frac{D_A}{D_R}\right)^{u_0} e^{u_1 \left(\frac{D_A}{D_R} - 1\right)} \quad (10)$$

$$L_2 = \frac{C_R}{C_A} \quad (11)$$

where parameters $u_0$ and $u_1$ can be calculated by applying a curve fitting procedure to cycle life versus DOD data available from the battery datasheet. Similarly, $C_A$ can be obtained by applying a one dimensional or 1-D cubic spline interpolation on finite pairs of data for battery capacities versus discharge currents.

Different methods can be used to perform curve fitting. Two different methods have been used in this study including particle swarm optimization (PSO) and non-linear least square (NLLS) method from MATLAB curve fitting toolbox. PSO, as a heuristic optimization technique, is able to achieve optimal solution in a small fraction of a second and is a curve fitting tool compatible with nonlinear battery characteristics. Also, NLLS is a popular regression method which has been used. The results of curve fitting by PSO and NLLS for a sample battery are shown in simulation results.

The battery End of Life (EOL) reaches when the cumulative effective ampere-hours for all discharge events on the battery equals the rated charge life of the battery which is defined as:

$$\phi_R = L_R \times D_R \times C_R \quad (12)$$

Based on the above discussion, life of a battery under a specified usage pattern can be estimated as follows:

$$LF_{batt} = \frac{L_R \times D_R \times C_R}{\sum_{i=1}^{n} L_{1,i} \times L_{2,i} \times d_{act,i}} \times T \quad (13)$$

To derive (13) it is assumed the same series of discharge events (1, . . . , n) will be repeated for the remaining life of the battery under study. Curve fitting on the data is required to determine the coefficients of the function in (10). The root mean square error (RMSE) of the curve fitting is 0.124 and 3.509 for PSO and NLLS methods, respectively. This error is defined as follows:

$$RMSE = \sqrt{\frac{x_1^2 + x_2^2 + \ldots + x_n^2}{n}} \quad (14)$$

where $x_n$ is the error between data sample n and the value obtained by fitted curve. The results from PSO are far better than the results from NLLS method. As a result of using PSO, battery lifetime estimation will be more accurate which results in a more accurate calculation for the cost of battery.

FIG. 1A shows an exemplary block diagram of the power management unit in the controller. The primary management scheme detects any unbalance in the supply and demand based on the measured DG outputs and load demand. If DG generation is more than the demand and the storage unit is not fully charged the excess generation is used to charge the storage. If DG generation is less than the load demand, secondary management scheme is activated to cover the power shortage either by discharging the battery or by buying power from the grid. The system of FIG. 1A uses a real-time power and load management controller. The controller collects information about different DG generation power, storage state of charge, and the end-user demand. This will determine discharge pattern of the storage at the time of management which is used to estimate the battery lifetime and consequently calculating the cost of energy from the battery based on a levelized cost model. The cost of energy from the battery is then compared to the grid price signal. In this way the end-user can determine whether it is more cost-effective to use its own storage unit or to buy the power from the grid to balance the electric supply and demand. In case that the purchase of power from the grid is recommended, the end-user can decide to cut its load during high grid prices to reduce its utility bill. The management framework will be updated every minute.

In the first level, primary power management, general status of power flow in a microgrid is evaluated. Real-time data about the generation level and demand are collected and analyzed to calculate the mismatch power in the microgrid as follows:

$$P_{mismatch} = P_{DG} + P_{scheduled-grid} - P_{load} \quad (15)$$

If excess generation is available in the microgrid (mismatch power is positive), it will be used to charge the battery. If sellback is allowed and the battery is fully charged, excess generation can also be exported to the grid. In case of any shortage in the local generation (negative mismatch power), primary management triggers the secondary power management unit to remedy the shortage either by importing power from the grid or discharging the battery (or both).

Input parameters to the primary power management unit include DG output powers, load demand, battery state of charge (SOC), and scheduled imported power from the grid (if any). This scheduled power is considered as a fixed source of generation (typically only changing on an hourly basis) which is planned in advance based on a unit commitment analysis or other methods. Any imported power from the grid decided by the secondary management unit will be added to the scheduled power from the grid.

Figure 1B:
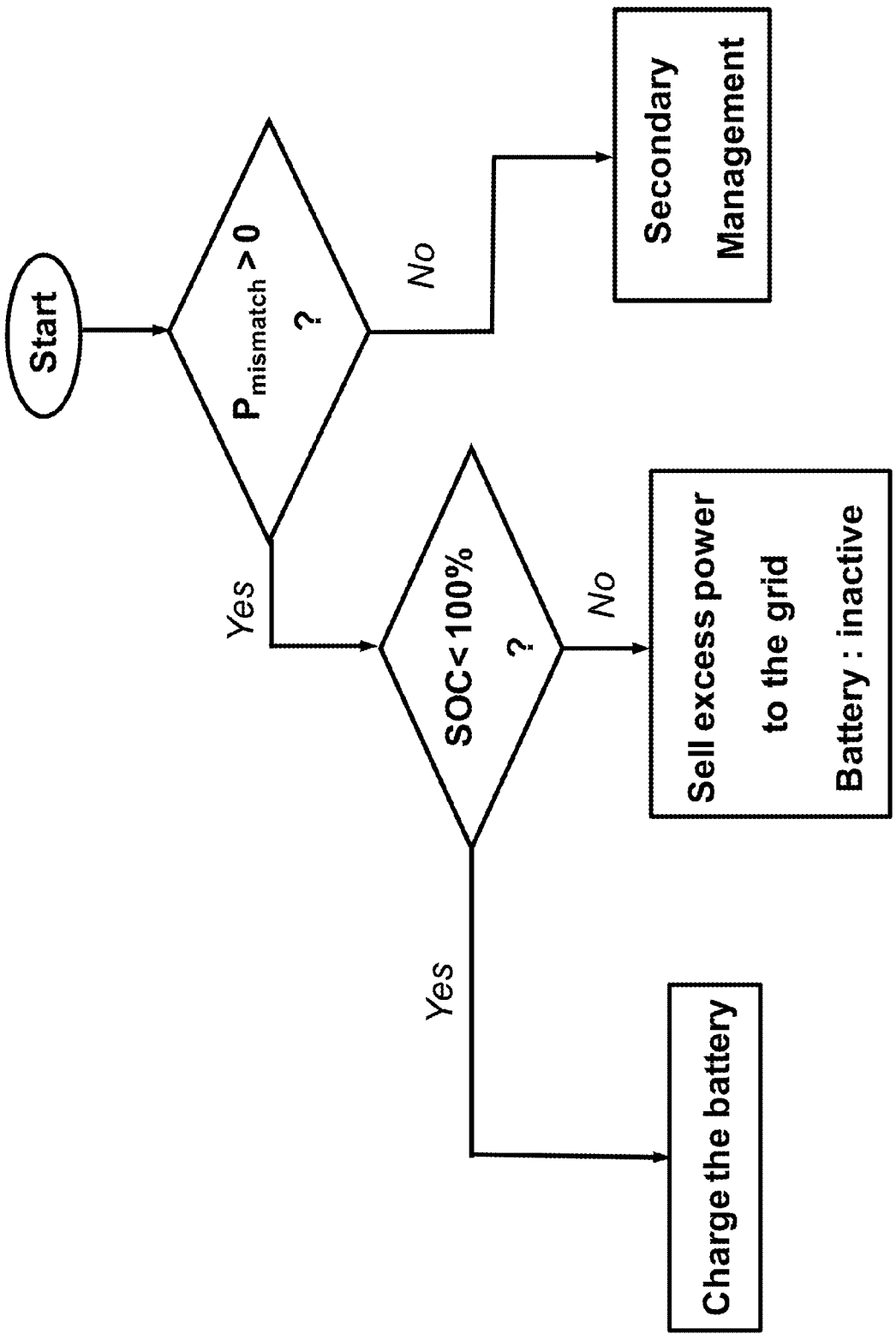
FIG. 1B shows an exemplary primary power management flowchart.

Primary power management flowchart is depicted in FIG. 1B. Primary power management unit checks the status of microgrid every minute to achieve a reliable and efficient real-time control of the system. If necessary, secondary power management is then triggered to decide on how to remove the power shortage in a microgrid.

Figure 2:
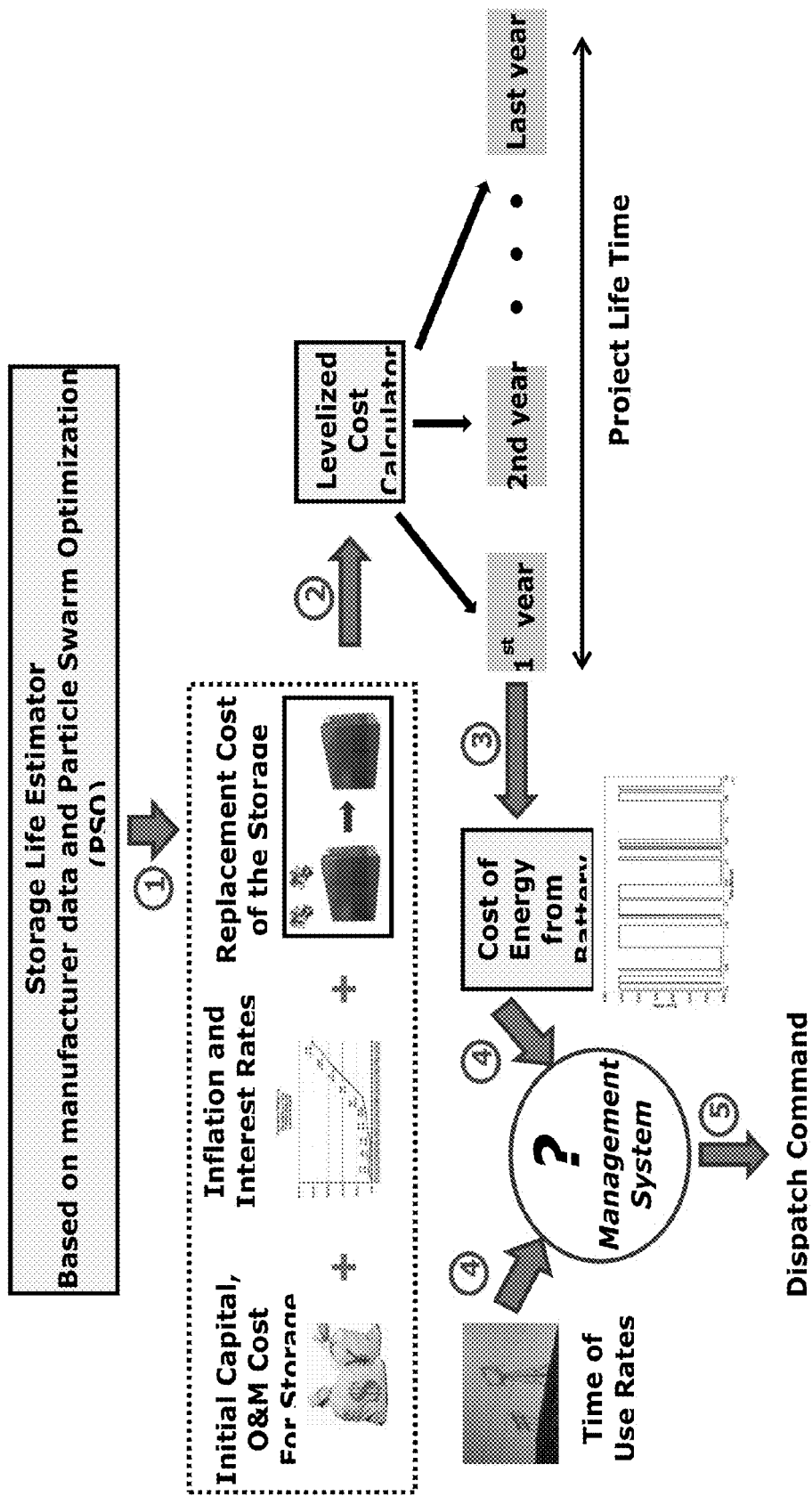
FIG. 2 depicts an exemplary levelized cost model which is used to calculate the cost of energy from a battery.

FIG. 2 depicts the levelized cost model which is used to calculate the cost of energy from the battery. The storage life estimator decides if any replacement of storage will become necessary during the project life-time depending on the current discharge requirement. Based on the output of the life estimator and economic parameters such as inflation and interest rates, the net present cost of storage is divided over the project life-time to calculate the cost of energy from the battery. Finally the cost of energy from the battery is compared with the grid price to make a decision on using the grid or discharging the battery.

In one embodiment, the system of FIG. 2 uses the following input parameters and steps to calculate cost of energy from a battery in the secondary management unit. This unit first estimates corresponding discharge current and DOD of the battery if it is going to be used to meet the power shortage. These parameters can be calculated as follows:

$$I^*_{discharge} = P_{mismatch} / V_{battery} \quad (16)$$

$$DOD^* = abs\left(\frac{I^*_{discharge} \times t_{discharge}}{C_R}\right) \quad (17)$$

These parameters are then used in the BLE unit to update the estimated life of the battery based on (13) as shown in step 1 in FIG. 1A. The output of BLE unit determines the battery replacement cost during the useful lifetime of the microgrid. Battery replacement cost along with other necessary parameters such as battery capital cost, battery O&M cost, nominal interest rate and inflation rate and useful project lifetime are passed to the EUAC calculator block (step) which calculates the annualized cost of battery from (1). Battery usage cost is then calculated from the output of EUAC calculator block by using (8) (step 3). Finally cost of energy from battery (CEB) is calculated based on (9) by adding the charging cost of battery to the battery usage cost (step 4).

By comparing CEB with the grid price, the cheaper source of energy either from the battery or from the grid is detected and will be used to supply the power shortage in a microgrid.

Figure 3A:
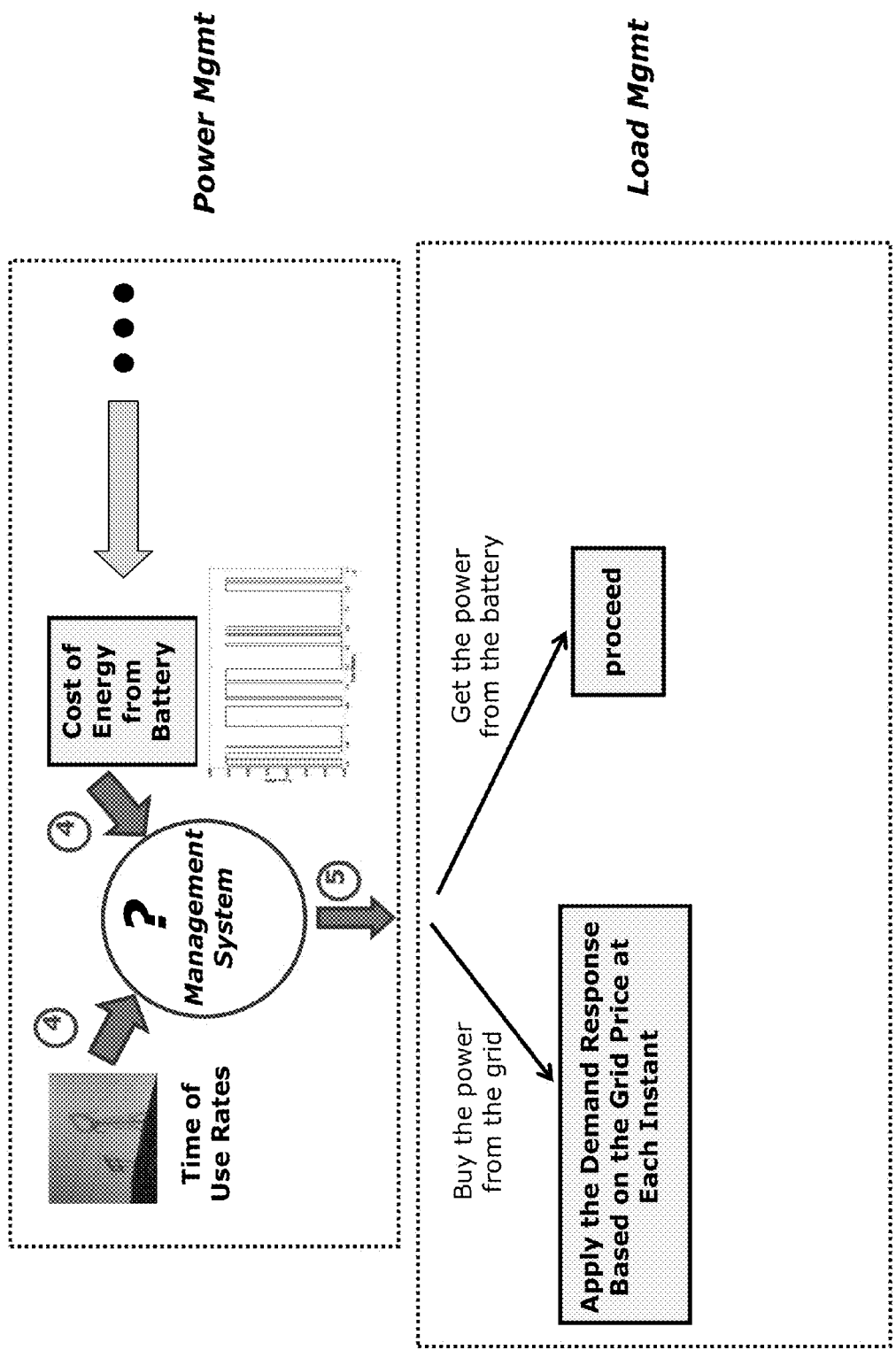
FIG. 3A shows a load management unit which decides when the demand response can be applicable in order to reduce the utility bill.
Figure 3B:
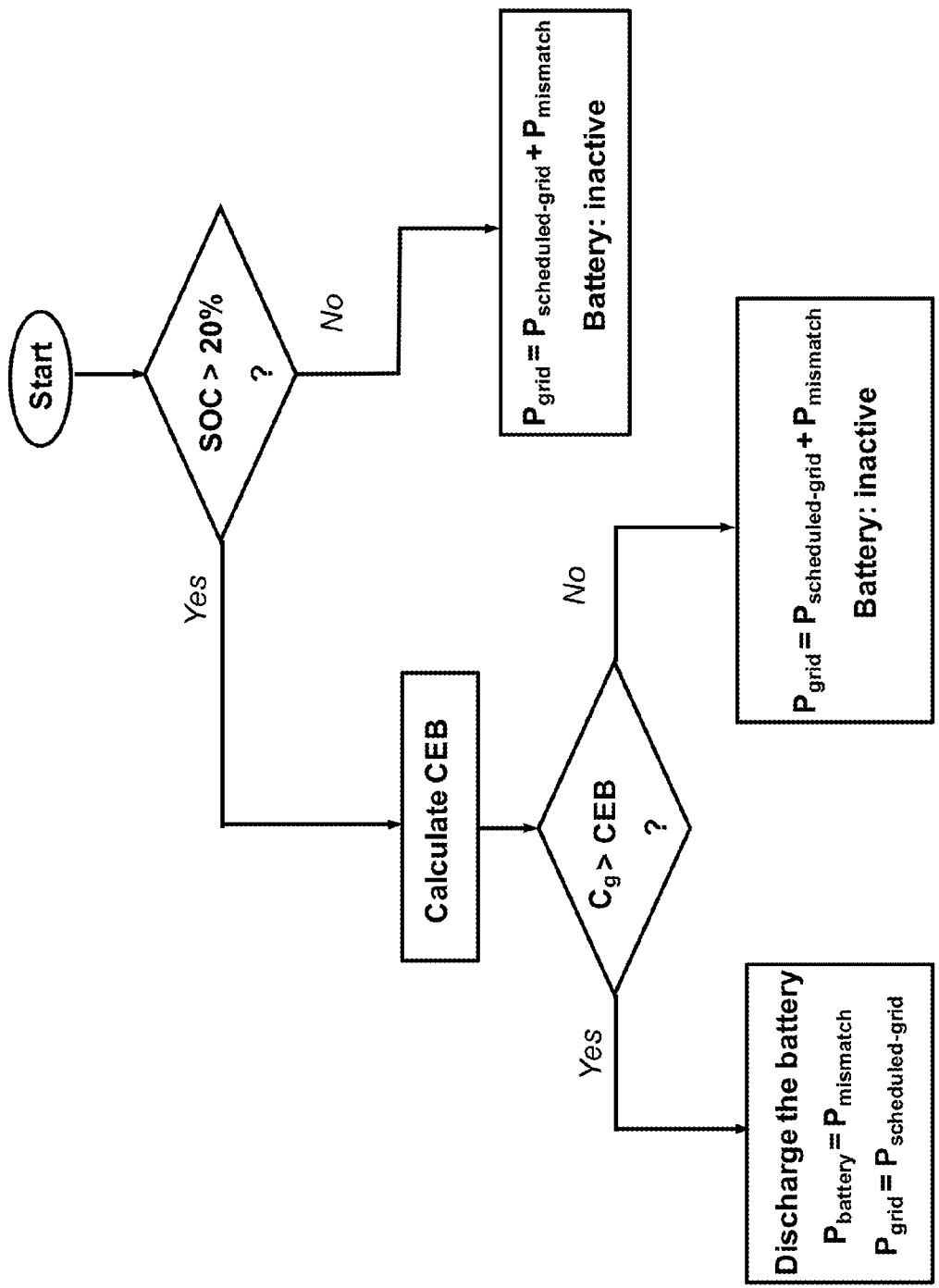
FIG. 3B shows an exemplary secondary power management flowchart.

Decision making process in the secondary power management unit is visually presented in FIG. 3A. Secondary power management flowchart is depicted in FIG. 3B.

FIG. 3A shows the load management unit in the controller which decides when the demand response can be applicable in order to reduce the utility bill. If the power management unit decides to discharge the battery no demand response is necessary. On the other hand, if the power management unit decides to buy the power shortage from the grid then the end-user can dynamically decide to cut its load if the grid price is high. The demand response algorithm can be carried out without the user interaction by specifying the percentage of the load shedding based on the grid price in advance. The proposed demand response algorithm is new and different from the state of the art.

Ever increasing installation of microgrids in residential, commercial, and industrial buildings requires Demand Response (DR) programs which take into account customer side electric energy generation and storage capabilities. Conventional DR programs in the distribution level only focus on the interaction between the utility and the end-users based on the grid price signal or incentives offered by the utility. Previous studies in this area neglected the effects of having distributed generations and energy storage units on the energy consumer decision to participate in a demand response program.

A real-time load management controller can be used in conjunction with the power management units described above. The power management units determine whether it is more cost-effective to use on-site storage unit or to buy the power from the grid to balance the electric supply and demand in case of any power shortage. When the purchase of power from the grid is recommended, the load management controller can decide to drop part of the load during peak grid prices to reduce the utility bill. The main differentiation of the proposed load management technique compared to previous methods is that it decides in real-time if a demand response execution (load shedding) can result in any saving in terms of the utility bill.

Figure 4:
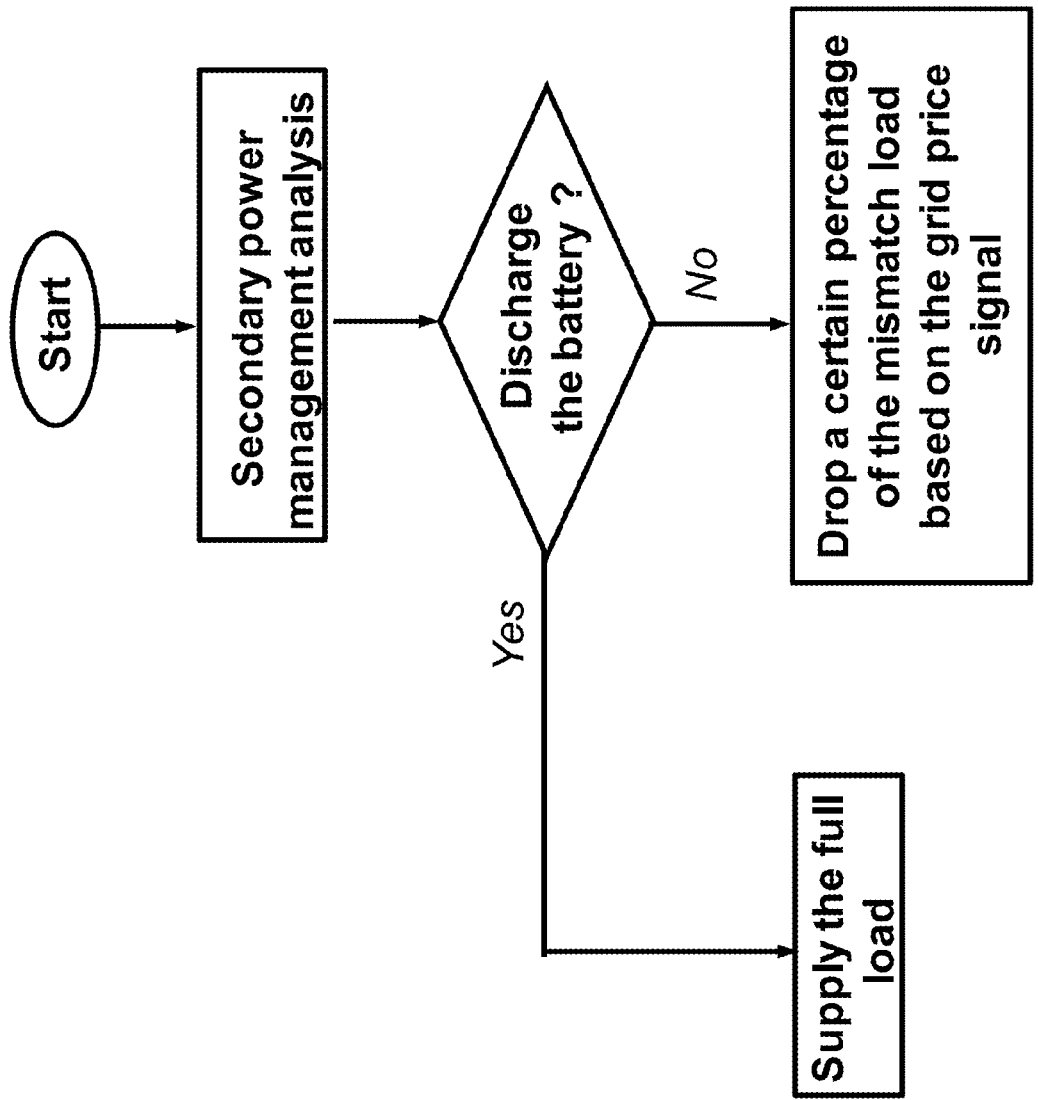
FIG. 4 shows an exemplary load management flowchart.

FIG. 4 shows the load management flowchart. It can be carried out without the user interaction by specifying the percentage of the load shedding based on the grid price in advance. This solution will provide a guideline for energy consumers to assess the benefits and an automated mechanism to participate in a DR program. It can be used to ensure the end-users that their storage unit will be fully utilized during the desired time span already specified. Also, it detects in real-time when it is necessary to buy the power from the grid and how much saving can be achieved by cutting the load. Real-time control takes into account any unexpected changes in the distributed generation, demand, and the grid price signal. The whole algorithm presents relatively small complexity and very fast solution so that it can be easily implemented in real-time. Overall, it characterizes demand as a virtual resource.

The foregoing presents an intelligent power and load management system for cost-effective real-time operation and control of distributed energy resources (microgrids) including distributed generations, batteries and controllable loads. Special attention is paid to the battery cost model since batteries are the most expensive components of a microgrid. The model to derive the cost of energy from battery (CEB) is based on the number of necessary battery replacements over the micro grid useful lifetime. This cost model is later used for electric power sharing between the battery and the grid as the two controllable sources of electric energy in a microgrid. The new cost model dynamically adjusts the number of battery replacements in a way to keep the cost of energy from the battery comparable to the grid price. This battery cost model is compared with HOMER energy modeling software cost model to show its superior performance.

The load management technique is also presented which complements the power management technique in order to maximize the operational cost saving for the microgrid owner. The load management technique is activated when the power management system decides to import power from the grid. In this way, the overall management system tries to optimally utilize the installed battery in a microgrid before applying load shedding in the system. This new load management system considers impacts of both on-site storage capacity and grid price signal while current demand response programs are only based on the grid price or other signals from the utility.

Case studies based on real data for a commercial building with on-site PV and wind generations and a lithium-ion battery show the effectiveness of the proposed power and load management system for the operation of a microgrid. By using the intelligent management system up to 60% saving in terms of the operational cost for the mismatch power in a microgrid compared to a no-battery scenario can be achieved. Sensitivity studies are also carried out to show the impacts of possible future changes in parameters of the microgrid on the performance of the intelligent management system.

An alternative power management system based on a fixed battery lifetime scheme is also taught. This approach is useful when the desired battery lifetime is already determined in advance and the management system is responsible for making sure the battery capacity is fully utilized within the specified time period. Results obtained based on the fixed lifetime approach are compared with IPMS for the same case study.

Rapid growth in the installation of microgrid systems requires intelligent and cost effective solutions to control charge and discharge of the battery and other controllable assets in the system. Current providers of storage systems for residential and commercial buildings do not provide smart management techniques to minimize the cost of electricity for the customer. The IPLMS can be used to monitor and control a microgrid system with the minimal interaction from the end user. It can also be made flexible enough to work with different electricity tariffs, renewable energy to load ratios, and battery technologies.

The management system can be further improved by defining a cost function to be used as a reference for charging the battery. Currently, the charging strategy is based on heuristic rules which must be defined based on specifics of each application. A charge cost function eases the way to develop a universal charging strategy for batteries in microgrids. Also, the current version of IPLMS only switches between the battery and the grid. A mechanism to share the mismatch power between these two sources of energy can be used to enhance IPLMS performance. Other applications of the storage in distribution networks such as peak shaving and load following can also be realized by modifying the cost function accordingly in the IPLMS. In particular, to implement a peak shaving scenario grid price signal should include an extra component related to demand charges.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

LIST OF SYMBOLS $L_1$ Weighting factor related to depth of discharge
$L_2$ Weighting factor related to discharge current
$D_A$ Depth of discharge of a discharge event
$D_R$ Rated depth of discharge
$C_A$ Actual capacity of a battery for a discharge event (Ah)
$C_R$ Rated ampere-hours capacity of a battery at rated discharge current (Ah)
$I_{discharge}$ Battery discharge current
$\phi_R$ Rated charge life
$L_R$ Rated cycle life
$LF_{batt}$ Estimated battery life
T Time period of system operation for series of discharge events 1 to n
$d_{act}$ Measured ampere-hours for a discharge event (Ah)
$d_{eff}$ Effective ampere-hours for a discharge event (Ah)
BUC Battery usage cost ($/kWh)
CEB Cost of energy from battery ($/kWh)
$C_{charge}$ Cost of charging the battery ($/kWh)
EUAC Equivalent uniform annual cost ($)
RBC Rated battery capacity (kW)
CC Capital cost ($/kW)
RC Replacement cost ($/kW)
SFF Sinking fund factor
CRF Capital recovery factor O&MC Annual operation and maintenance cost, $/kAh/year
F Inflation rate, %
$i_{act}$ Actual interest rate, %
$i_{nom}$ Nominal interest rate, %
NO,rep Number of replacements of the battery
$Y_{rep}$ Replacement year
$Y_{proj}$ Useful lifetime of a project (years)
$I^*_{discharge}$ Estimated battery discharge current (A)
DOD* Estimated depth of discharge
$P_{mismatch}$ Mismatch power (W)
$V_{battery}$ Battery voltage (v)
$P_{DG}$ Total DGs output power (W)
$P_{scheduled-grid}$ Scheduled power from the grid (W)
$P_{load}$ Demand (load) (W)
$C_g$ Grid price ($/kWh)
$P_{battery}$ Battery power (W)
$Q_{lifetime}$ Battery lifetime throughput (kWh)
$f_i$ Battery cycle life
$C_{bw}$ Battery wear cost ($/kWh)
$\mu_{rt}$ Battery roundtrip efficiency
$CEB_{HOMER}$ Cost of energy from battery based on HOMER model ($/kWh)
$t_{discharge}$ Discharge time for a particular discharge event (hour)

What is claimed is:

1. A method for managing demand or load, comprising:
receiving input demand by a real-time power and load management controller; information including different generation power, storage state of charge, and end-user demand;
determining a discharge pattern of a storage used to estimate the battery lifetime and determining discharge event for the local battery as:

$$L_1 = \left(\frac{D_A}{D_R}\right)^{u_0} e^{u_1\left(\frac{D_A}{D_R}-1\right)}$$

$$L_2 = \frac{C_R}{C_A}$$

where parameters $u_0$ and $u_1$ are determined by fitting cycle life versus depth of discharge (DOD) data, $D_A$ is a depth of discharge of a discharge event, $D_R$ is a rated depth of discharge, $C_R$ is a rated capacity of a battery at rated discharge current, and $C_A$ is determined by applying a one dimensional cubic spline interpolation on finite pairs of data for battery capacities versus discharge currents;
upon receipt of a demand response signal or a load management request from a utility to change a price of electricity, determining a cost of energy from a local battery, calculating a cost of energy from the battery based on a levelized cost model, wherein the cost of energy from the battery is then compared to the utility cost;
if the cost of energy from battery is higher than the cost of electricity from the utility, shedding power from one or more devices based on the utility cost, and otherwise discharging power from the battery to reduce a net load on the grid without any actual load reduction.

2. The method of claim 1, comprising applying a levelized cost model for a storage unit which provides the cost of energy from the battery to be compared with a grid price.

3. The method of claim 2, comprising applying a storage life esitmator to determine when a storage unit is to be replaced based on a current discharge requirment.

4. The method of claim 2, comprising applying economic parameters including inflation and interest rates, and dividing a net present cost of the storage unit over a project life-time to calculate a cost of energy from the battery.

5. The method of claim 2, comprising applying a cost of energy from the battery with a grid price to make a decision on shedding the load or discharging the battery.

6. The method of claim 1, comprising deciding in real-time if a load management procedure is done through an actual load reduction or a battery discharge.

7. The method of claim 1, comprising determining a mismatch power in the microgrid as follows:

$$P_{mismatch} = P_{DG} + P_{scheduled-grid} - P_{load}$$

where P represents power.

8. The method of claim 1, comprising performing load management without user interaction by specifying a percentage of a load shedding based on a grid price in advance.

9. The method of claim 1, comprising determining a cost of energy from a battery in a secondary management unit that estimates a discharge current and DOD of the battery if it is going to be used to meet the power shortage as follows:

$$I^*_{discharge} = P_{mismatch} / V_{battery}$$

$$DOD^* = abs\left(\frac{I^*_{discharge} \times t_{discharge}}{C_R}\right)$$

wherein P represents power, V represents voltage, I represents current, and DOD represents an estimated depth of discharge.

10. The method of claim 1, comprising applying demand response management without the user interaction by specifying a percentage of a load shedding based on a grid price in advance.

11. The method of claim 1, comprising:
detecting an unbalance in a supply and a demand based on a measured distributed generation (DG) output and a load demand; and
if a DG generation of power is more than the demand and an energy storage unit is not fully charged, applying the excess energy generation to charge a storage unit.

12. A system for energy management, comprising:
an energy storage unit;
a computer coupled to a distributed generator (DG) and a grid;
a primary management unit for detecting an unbalance in a supply and a demand based on a measured distributed generation output and a load demand;
computer code for receiving input demand by a real-time power and load management controller; information including different generation power, storage state of charge, and end-user demand;
computer code for determining a discharge pattern of a storage used to estimate the battery lifetime and determining discharge event for the local battery as:

$$L_1 = \left(\frac{D_A}{D_R}\right)^{u_0} e^{u_1\left(\frac{D_A}{D_R}-1\right)}$$

$$L_2 = \frac{C_R}{C_A}$$

where parameters $u_0$ and $u_1$ are determined by fitting cycle life versus depth of discharge (DOD) data, $D_A$ is a depth of discharge of a discharge event, $D_R$ is a rated depth of discharge, $C_R$ is a rated capacity of a battery at rated discharge current, and $C_A$ is determined by applying a one dimensional cubic spline interpolation on finite pairs of data for battery capacities versus discharge currents; and a secondary management unit for managing energy, including:

computer code for applying excess energy generation to charge the storage unit if a DG generation of power is more than the demand and an energy storage unit is not fully charged; and computer code for applying a secondary management scheme to a power shortage either by discharging the battery or by buying power from a grid or by actual load reduction if the DG generation is less than the load demand.

13. The system of claim 12, comprising computer code for applying a levelized cost model for the storage unit which provides the cost of energy from the battery to be compared with a grid price.

14. The system of claim 13, comprising computer code for applying a storage life esitmator to determine when a storage unit is to be replaced based on a current discharge requirment.

15. The system of claim 13, comprising computer code for applying economic parameters including inflation and interest rates, and dividing a net present cost of the storage unit over a project life-time to calculate a cost of energy from the battery.

16. The system of claim 12, comprising computer code for applying a cost of energy from the battery with a grid price to make a decision on using the grid or discharging the battery.

17. The system of claim 12, comprising computer code for deciding in real-time if a demand response execution (load shedding) results in cost saving.

18. The system of claim 12, comprising computer code for determining a mismatch power in the microgrid as follows:

$$P_{mismatch} = P_{DG} + P_{scheduled\text{-}grid} - P_{load}$$

where P represents power.

19. The system of claim 12, comprising computer code for performing load management without user interaction by specifying a percentage of the load shedding based on a grid price in advance.

20. The system of claim 12, comprising computer code fordetermining a cost of energy from a battery in a secondary management unit that estimates a discharge current and DOD of the battery if it is going to be used to meet the power shortage as follows:

$$I^*_{discharge} = P_{mismatch} / V_{battery}$$

$$DOD^* = abs\left(\frac{I^*_{discharge} \times t_{discharge}}{C_R}\right)$$

wherein P represents power, V represents voltage, I represents current, and DOD represents an estimated depth of discharge.

21. The system of claim 12, comprising computer code for applying demand response management without the user interaction by specifying a percentage of a load shedding based on a grid price in advance.

\* \* \* \* \*